(12) United States Patent
Kniola et al.

(10) Patent No.: US 11,130,280 B2
(45) Date of Patent: Sep. 28, 2021

(54) SYSTEM FOR MANUFACTURING THREE-DIMENSIONAL OBJECTS

(71) Applicant: Wematter AB, Linköping (SE)

(72) Inventors: Robert Kniola, Linköping (SE); Henrik Lundgren, Linköping (SE)

(73) Assignee: WEMATTER AB, Linköping (SE)

( * ) Notice: Subject to any disclaimer, the term of this patent is extended or adjusted under 35 U.S.C. 154(b) by 699 days.

(21) Appl. No.: 15/680,309

(22) Filed: Aug. 18, 2017

(65) Prior Publication Data
US 2017/0341299 A1  Nov. 30, 2017

Related U.S. Application Data

(63) Continuation of application No. PCT/SE2016/050129, filed on Feb. 18, 2016.

(30) Foreign Application Priority Data

Feb. 19, 2015 (SE) .................................... 1550186-9

(51) Int. Cl.
*B29C 64/153* (2017.01)
*B33Y 30/00* (2015.01)
(Continued)

(52) U.S. Cl.
CPC ............ *B29C 64/153* (2017.08); *B22F 12/00* (2021.01); *B29C 64/25* (2017.08); *B33Y 30/00* (2014.12);
(Continued)

(58) Field of Classification Search
CPC ....... B29C 64/153; B29C 67/00; B29C 64/25; B33Y 70/00; B33Y 30/00; B22F 3/1055;
(Continued)

(56) References Cited

U.S. PATENT DOCUMENTS

| 2002/0090410 A1* | 7/2002 | Tochimoto | ............ | B29C 64/321 |
| | | | | 425/215 |
| 2004/0084814 A1* | 5/2004 | Boyd | ..................... | B33Y 40/00 |
| | | | | 264/497 |

(Continued)

FOREIGN PATENT DOCUMENTS

| CA | 2886438 A1 | 4/2014 | | |
| EP | 1316408 A1 * | 6/2003 | ............. | B08B 7/028 |

OTHER PUBLICATIONS

Espacenet.com, Machine Translation of EP-1316408-A1, Herzog et al., obtained Mar. 14, 2020 (Year: 2020).*

*Primary Examiner* — Michael M. Robinson
(74) *Attorney, Agent, or Firm* — Gabriela B. Tomescu, Esq.; Bergenstråhle & Partners. AB

(57) ABSTRACT

Disclosed is a sintering system for manufacturing a three-dimensional object from sinterable powder. The system comprises a build chamber with a movable floor and four walls, an energy assembly disposed above the build chamber and which comprises at least one energy source adapted to emit an energy beam. The system further comprises a feeding assembly connected to the build chamber for providing sinterable powder to the build chamber and a powder distribution device connected to the feeding assembly for distributing sinterable powder in the build chamber. The build chamber further comprises at least one opening in at least one wall, below which the movable floor can be lowered, and a pneumatic assembly connected to the build chamber for transporting powder away from the build chamber through the at least one opening.

7 Claims, 4 Drawing Sheets

(51) Int. Cl.
  *B22F 12/00* (2021.01)
  *B29C 64/25* (2017.01)
  *B33Y 70/00* (2020.01)
  *B22F 10/10* (2021.01)

(52) U.S. Cl.
  CPC .............. *B33Y 70/00* (2014.12); *B22F 10/10* (2021.01); *Y02P 10/20* (2015.11); *Y02P 10/25* (2015.11)

(58) Field of Classification Search
  CPC ...... B22F 2003/1056; B22F 2003/1059; B22F 3/105; Y02P 10/24; Y02P 10/295
  See application file for complete search history.

(56) References Cited

U.S. PATENT DOCUMENTS

| | | |
|---|---|---|
| 2005/0116391 A1 | 6/2005 | Lindemann et al. |
| 2007/0023977 A1 | 2/2007 | Braun et al. |
| 2007/0026145 A1* | 2/2007 | Lindemann ........... B29C 64/153 427/248.1 |
| 2010/0044547 A1 | 2/2010 | Higashi et al. |
| 2016/0052054 A1* | 2/2016 | Orange .................. B22F 3/003 425/78 |

* cited by examiner

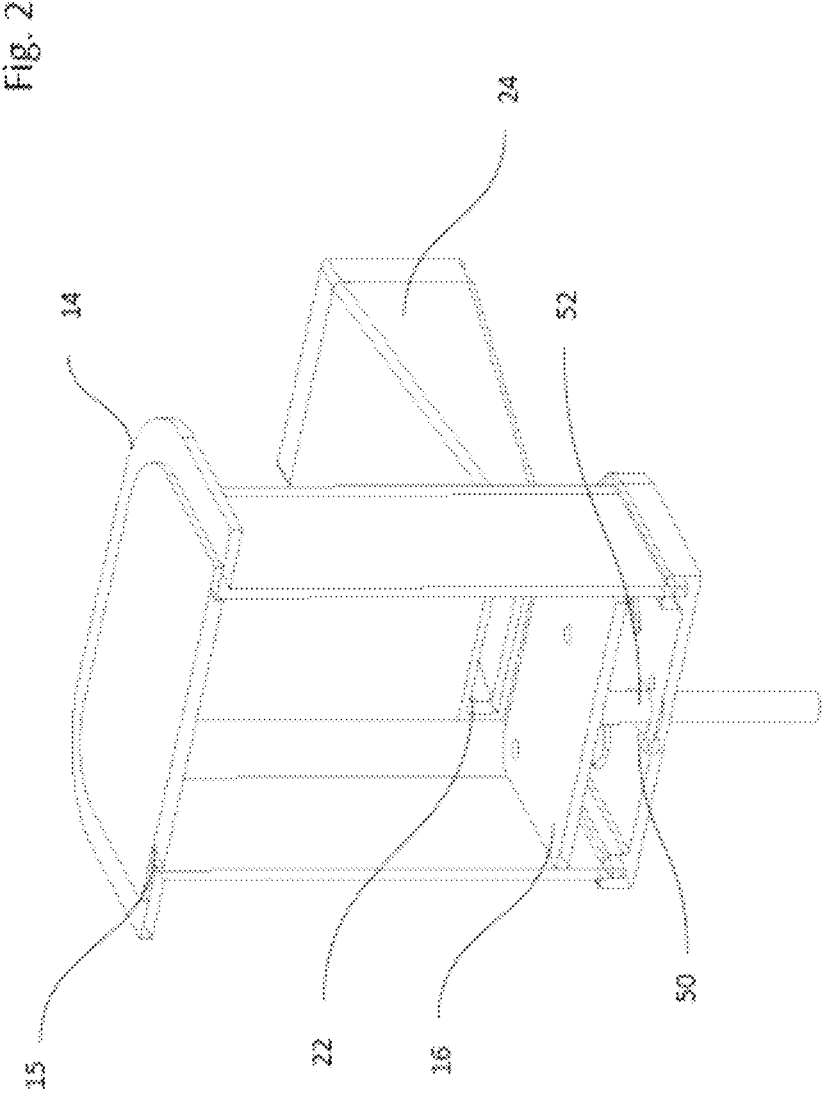

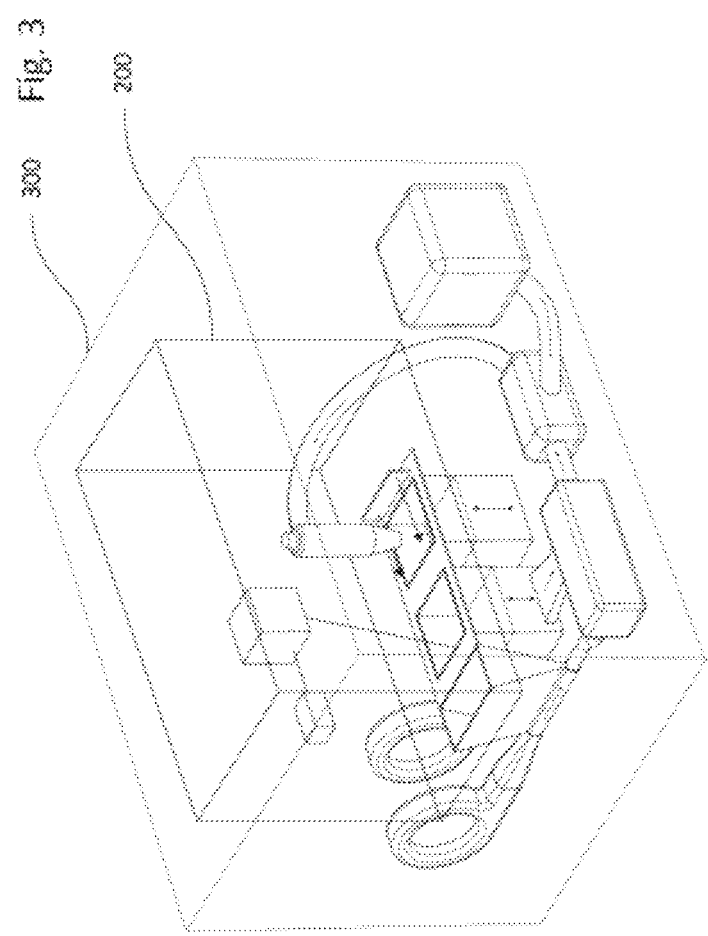

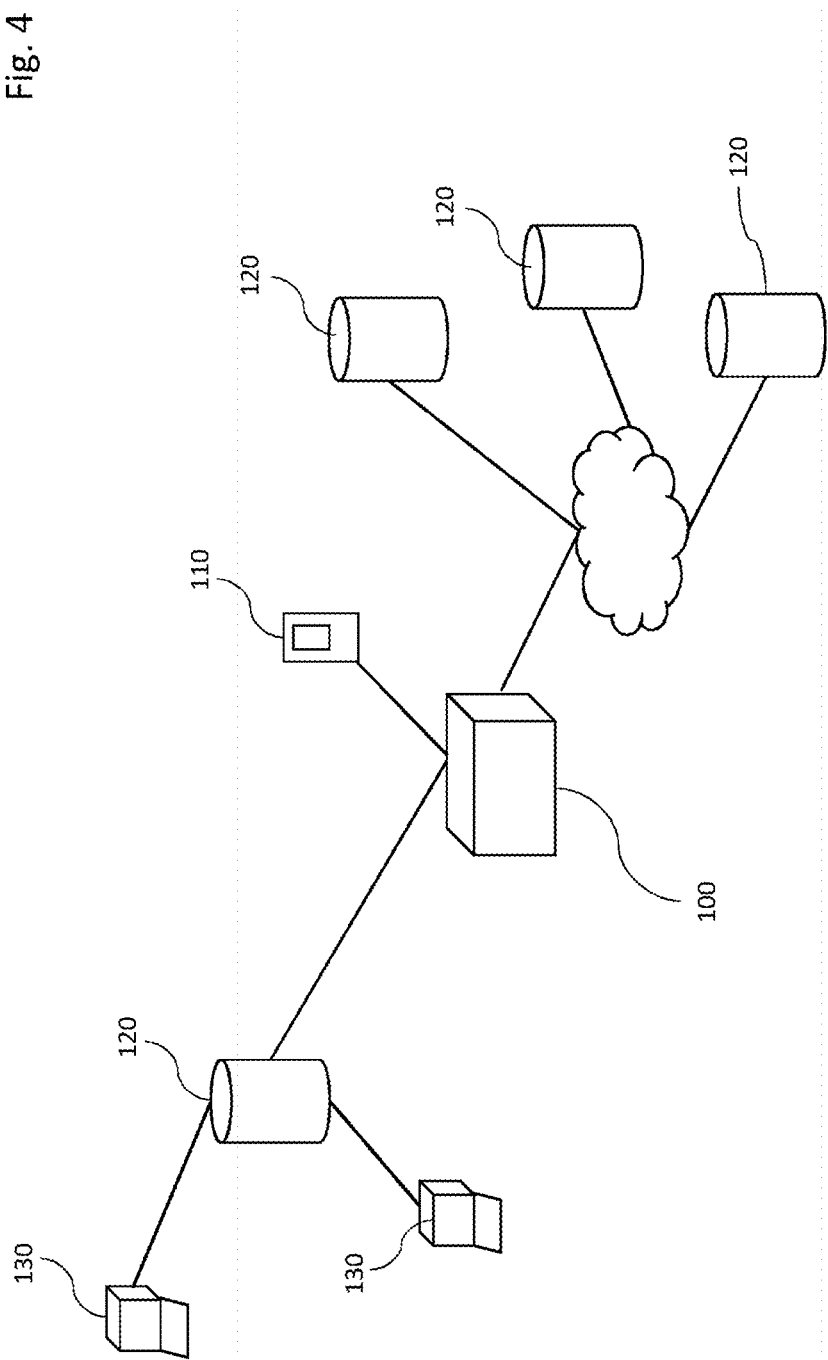

SYSTEM FOR MANUFACTURING THREE-DIMENSIONAL OBJECTS

This application is the continuation of International Application No. PCT/SE2016/050129, filed 18 February, 2016, which claims the benefit of Swedish Patent Application No. SE 1550186-9, filed 19 February, 2015, the entire contents of which are hereby incorporated by reference.

TECHNICAL FIELD

The present solution relates to a system for manufacturing three-dimensional objects.

BACKGROUND ART

Manufacturing three-dimensional objects is something that is well known within the art. One form of this manufacturing is sintering, which uses high temperature and optionally high pressure in order to shape sinterable powder into an object. The powder is typically comprised of a polymer or a metal, and an energy beam, such as a laser, is used to cause the powder particles to fuse to one another. The process is usually based on dividing a model into layers, then manufacturing the object one layer at a time.

One problem with sintering systems is that not all powder is used during the sintering process. Typically the powder is made of materials that are harmful to people. In most sintering systems, there is unused powder left in the build chamber after a manufacturing process has been performed, which is not optimal.

Furthermore, most sintering systems used today are for industrial use. However, as the technology develops, it becomes increasingly interesting to also adapt it for personal use. However, such adaptation has to take into consideration that the average user in a personal setting is likely not as educated about the system as a person using a sintering system adapted for industrial use. Therefore, it would be desirable to make relevant adaptations to the technology that makes it more suitable for personal use.

SUMMARY

It is an object of the solution to address at least some of the problems and issues outlined above. It is possible to achieve these objects and others by using systems as defined in the attached independent claim.

According to one aspect, there is provided a sintering system for manufacturing a three-dimensional object from sinterable powder. The system comprises a build chamber with a movable floor and four walls, an energy assembly disposed above the build chamber and which comprises at least one energy source adapted to emit an energy beam. The system further comprises a feeding assembly connected to the build chamber for providing sinterable powder to the build chamber and a powder distribution device connected to the feeding assembly for distributing sinterable powder in the build chamber. The build chamber further comprises at least one opening in at least one wall, below which the movable floor can be lowered, and a pneumatic assembly connected to the build chamber for transporting powder away from the build chamber through the at least one opening.

By implementing the system as described above, an improved system for manufacturing three-dimensional objects may be achieved, comprising a safe and effective mechanism for removing any unused powder in the build chamber that is left after a manufacturing process has been completed.

In optional embodiments, the system may further comprise a cover plate at the predetermined level below which the movable floor can be lowered. By having such a cover, it is possible to in a better way seal the area being cleaned by the pneumatic assembly.

In optional embodiments the pneumatic assembly may comprise a fan unit, and/or it may comprise a suction unit. The pneumatic assembly may also comprise one fan unit and one suction unit, positioned in opposite openings in two side walls in the build chamber. In some embodiments, the pneumatic assembly may comprise one or more units that can both blow and suction, i.e. a combined fan unit and suction unit.

In some embodiments, when the pneumatic assembly comprises at least one combined suctioning/blowing unit at one end and at least one suctioning/blowing unit at the other end, the pneumatic assembly may be adapted to alternately apply suction from one side and pressure from the other, and vice versa. This may be beneficial for removing powder, and possibly other residuals, from the build chamber. By alternating between suctioning and blowing from one side to the other side, a better cleaning of the build chamber may be achieved. These optional embodiments may further improve the efficiency and safety of removing powder from the build chamber.

In an optional embodiment the system may further comprise a powder catcher connected to the build chamber, for collecting surplus powder provided by the powder distribution device to the build chamber. There is also provided an optional embodiment comprising an air/powder separator (38) disposed above the feeding assembly, for separating powder from air. These optional embodiments may further improve the handling of powder within the sintering system, which increases the safety and efficiency of the system.

Another optional embodiment comprises a return powder device connected to the pneumatic assembly comprising at least one fan, for transporting unused powder away from the build chamber. It may further comprise a powder supply device for providing virgin powder and a powder mixing device connected to the return powder device and to the powder supply device for mixing returned powder with virgin powder and supplying the mixt to the feeding assembly, wherein the powder is transported from the build chamber into the powder mixing device by the return powder device.

In an optional embodiment one or more of the feeding assembly, the movable floor, the return powder device and the powder mixing device are further adapted to heat the powder.

According to one optional embodiment, the whole sintering system may be comprised within an enclosure/closed system, such that the sintering system may be closed off during a manufacturing process. This further increases the safety of the system by decreasing the risk of injury of a user interacting with the system.

In an optional embodiment the system further comprises a server operably connected to the sintering system comprising a database, wherein design data is provided by the server to the sintering system and wherein the server is adapted to determine and provide a movement pattern for the energy assembly to the sintering system. This enables remote control of the system and makes it possible to have a majority of the processing done outside of the sintering system, lessening the requirements for computational powder in the system.

By implementing a solution as described herein there is achieved a safer and more efficient system for manufacturing three-dimensional objects, which is adapted for personal use rather than industrial use. The present system is suitable to produce in sizes that are appropriate for use in the office rather than in large industrial facilities. This enables sharing of the system within e.g. an office environment and is also suitable for systems that can be leased or rented.

The above system may be configured and implemented according to other different optional embodiments. Further possible features and benefits of this solution will become apparent from the detailed description below.

SHORT DESCRIPTION OF THE DRAWINGS

The solution will now be briefly described, by way of example, with reference to the accompanying drawings, in which:

FIG. 2 shows a cross-sectional picture of a build chamber according to one embodiment of the present disclosure.

FIG. 3 illustrates one embodiment of the sintering system with certain parts being in an enclosure/closed system.

FIG. 4 shows a typical architecture for a system according to the present disclosure.

DESCRIPTION OF EMBODIMENTS

Figure 1:
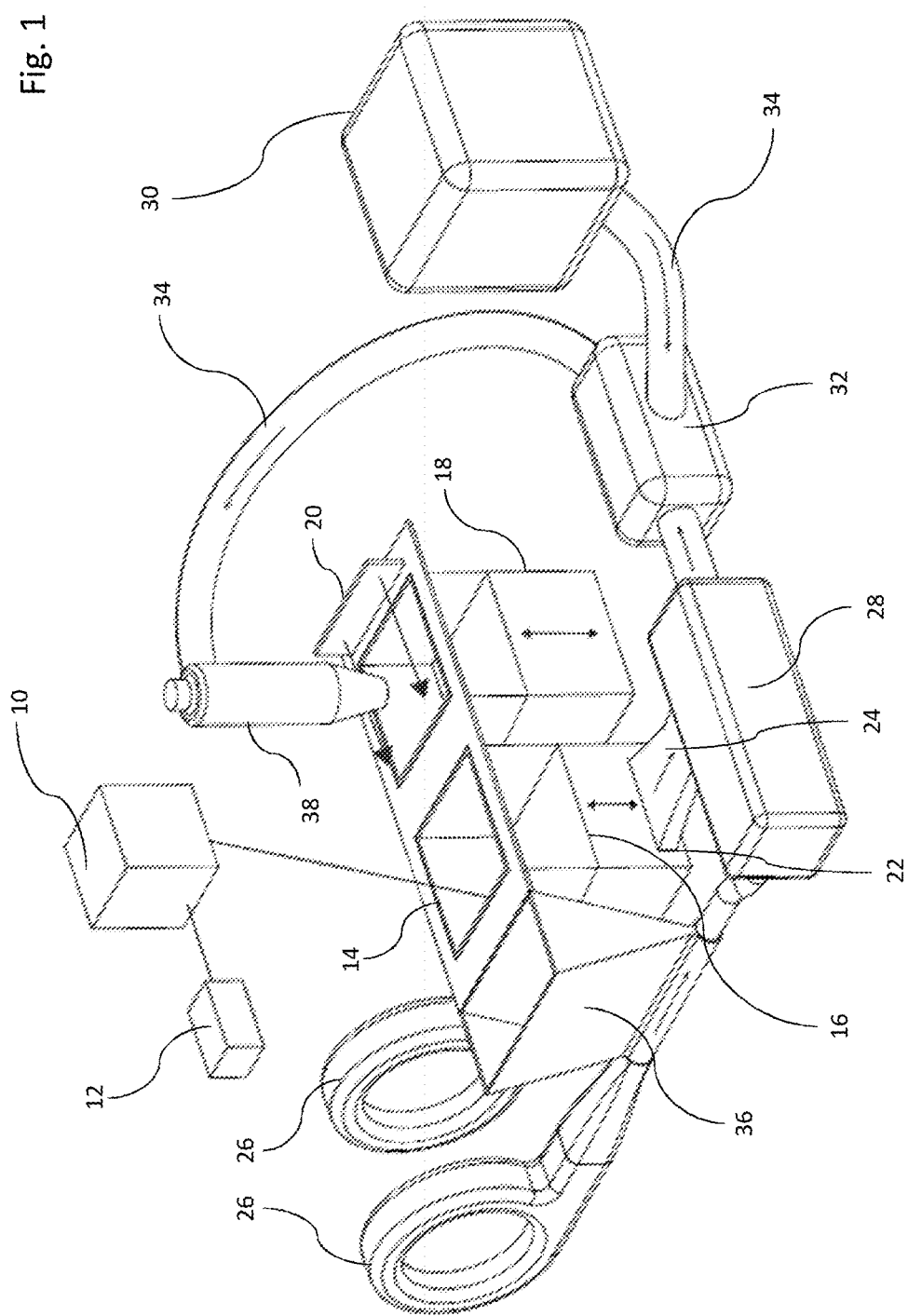
FIG. 1 shows an overview of the sintering system according to one embodiment of the present disclosure.

In the following, a detailed description of the different embodiments of the solution is disclosed with reference to the accompanying drawings. All examples herein should be seen as part of the general description and are therefore possible to combine in any way in general terms. Individual features of the various embodiments and methods may be combined or exchanged unless such combination or exchange is clearly contradictory to the overall function of the implementation.

Shortly described, the present disclosure relates to a sintering system for manufacturing three-dimensional objects, which is adapted for personal use rather than industrial use and which aims to solve the problem of having leftover powder in the build chamber after a manufacturing process has been performed. The adaptation to personal use rather than industrial use requires the system to be safer than the industrial systems, partly because people using sintering systems in the industry are more educated in the technology than other consumers. In a system adapted for industrial use, dedicated staff is used, while in a personal setting the system is more likely to be used by developers who don't necessarily use the system every day. The solution will now be described in more detail with reference to the accompanying drawings.

FIG. 1 shows a sintering system for manufacturing three-dimensional objects. The system comprises an energy assembly 10, 12 comprising at least one energy source 12, adapted to emit an energy beam. It further comprises a build chamber 14 comprising a movable floor 16 and at least four walls. A feeding assembly 18 is connected to the build chamber 14 for providing sinterable powder therein, and a powder distribution device 20, such as a scraper, is connected to the feeding assembly 18 for distributing sinterable powder in the build chamber 14. Optionally, a powder catcher 36 may be disposed adjacent and connected to the build chamber 14, for capturing surplus powder provided from the feeding assembly 18. A pneumatic assembly 24, 26 is connected to the build chamber at an opening 22 in at least one side wall, the pneumatic assembly for transporting powder away from the build chamber, usually after the manufacturing process has been completed but it is possible to do during manufacturing as well, if needed. The pneumatic assembly 24 may be further connected to a return powder device 28 for transporting the powder from the build chamber 14 back to the feeding assembly 18. The return powder device 28 may also be connected to a powder mixing device 30 for mixing the returned powder with new powder, which may be supplied from a powder supply device 32. The powder devices may be interconnected by tubes 34 for transporting the powder, which also connect the powder mixing device 32 with the feeding assembly 18. Generally, powder is transported in the system by use of air. Above the feeding assembly 20, there may optionally be disposed an air/powder separator 38 connected to the powder mixing device 32, for separating powder from the air. Such an air/powder separator may for instance be a cyclone. In other embodiments, it may be a simple filter or e.g. an electrostatic filter. In some embodiments, there may also be an air/powder separator connected to or disposed in the return powder device 28, also for separating powder from the air.

The energy assembly 10, 12 preferably comprises at least one energy source 12 for emitting an energy beam, and at least one device 10 for scanning the build chamber 14 and positioning the beam. The energy source 12 may for instance be a laser or an electron beam. The device 10 for positioning the beam may for instance be a galvanometer, but it is also possible to use e.g. a Gantry system. In a typical embodiment, the energy assembly 10, 12 is positioned above the build chamber 14. The exact positioning may vary, but generally the energy assembly 10, 12 is positioned more or less directly above the build chamber 14.

The build chamber 14 comprises a movable floor 16 and four walls, and a it may also comprise a removable roof portion. The roof portion is removable in order to supply powder into the build chamber, and it is possible to close in order to counteract an overpressure arising during the sintering process. The build chamber 14 comprises at least one opening 22 in at least one wall, for transporting unused powder away from the build chamber 14 after a manufacturing process has been completed. The opening 22 is below a certain predetermined level and during the manufacturing process the movable floor 16 is constantly above this predetermined level. During the manufacturing process, powder is supplied to the build chamber in a layer-wise fashion. For each layer of the object to be produced, the build chamber 14 is opened, powder is supplied, then the build chamber is closed, the energy assembly 10, 12 is activated and the powder is sintered, whereafter the build chamber 14 is reopened and more powder is supplied for a subsequent layer of the object. After the manufacturing of an object has been completed, the movable floor 16 is above the opening 22. By lowering the movable floor 16 below the predetermined level, any powder that is remaining in the build chamber may be transported away from the build chamber through the at least one opening 22. This enables a safe, quick and easy way of removing unused powder, which is an advantage with the present disclosure. Unused powder may be harmful for humans, which is why removal of the powder in a safe way is highly desirable, especially in systems adapted for personal use rather than industrial use. Having a mechanism for removing the unused powder in this way also makes it possible to reuse the unused powder for subsequent objects to be manufactured. In some embodiments, the system may also comprise a cover 15 at the predetermined level, which is possible to close after the floor 16 has been lowered below the predetermined level. By closing the cover 15 at the predetermined level, the area that is being cleaned is sealed, which may result in a better removal of powder and other residuals Connected to and disposed adjacently to the build chamber 14, there is a feeding assembly 18. Connected to the at least one opening 22 there may be a pneumatic assembly 24, 26 adapted to transport powder away from the build chamber 14. The pneumatic assembly may comprise a unit 24 adapted to transport the powder out from the building chamber by suction. The assembly may in some embodiments also comprise a fan 26, for pushing the powder away from the build chamber. In one embodiment, the fan 26 is disposed on the opposite of the suction unit 24. In other embodiments, a fan 26 is disposed on the opposite side of the at least one opening 22 and there is only a passage 24 connected to the opening 22 for transporting the powder away from the build chamber, by use of the fan 26. The principle of the pneumatic assembly 24, 26 is to transport powder away from the build chamber 14 in a safe and effective manner. This may be done with a suction unit 24 at one side and a fan unit 26 at the other side, or it may be done with only a suction unit 24, or with only a fan unit 26. In some embodiments, there are also fans disposed in the top part of the build chamber 14 for pushing the powder downwards.

In some embodiments, the pneumatic assembly may comprise one or multiple units that are combined fan and suction units, such that they may alternate between suctioning and blowing. In some embodiments, the system comprises at least one combined suction/fan unit at one side of the opening 22 and at least one combined suction/fan unit at the opposite side of the opening 22, and wherein the at least two suction/fan units are adapted to alternately blow and suction in one way and then the opposite. For example, with one combined suction/fan unit at each side of the opening 22, the first suction/fan unit on one side of the opening will start blowing and the second suction/fan unit on the opposite side will start suctioning, and after a period of time, the first unit will reverse the operation and start suctioning instead, while the second unit reverses from suctioning to blowing. By alternating the suctioning and blowing as described above, a better cleaning of the build chamber 14 may be achieved.

There is needed at least one opening 22 out from the build chamber, and at least one means of transporting the powder, preferably a pneumatic assembly 24, 26 as described. However, in some embodiments a mechanical assembly may be used instead of a pneumatic assembly, for instance comprising a member for mechanically pushing the powder away from the build chamber 14 through the at least one opening 22.

In some embodiments, the present solution incorporates a powder catcher 36 for collecting surplus powder that is provided by the powder distribution device 20 to the build chamber 14. Typically, when providing powder from the feeding assembly 18 to the build chamber by use of the powder distribution device 20, there is powder in the feeding assembly 18, and the feeding assembly also comprises a movable floor. The floor is elevated so that an amount of powder is provided above the feeding assembly 18 and can be transported into the build chamber 14. In some embodiments the system is adapted to provide a surplus amount of powder, and then a powder catcher 36 may be used to collect such surplus powder. The powder catcher 36 is connected to and positioned adjacent to the build chamber, and uses the Venturi effect to lower the pressure of incoming air so that powder is not sent flying around in the system. Typically the powder catcher 36 is relatively broad at a top part and gradually tapering towards a bottom part, which is narrow compared to the top part. The powder catcher 36 separates the powder from the air. In some embodiments, the powder catcher 36 may be further connected to the trash bin or return powder device 28, and may be adapted to transport the powder there.

In some embodiments, the pneumatic assembly 24, 26 may simply transport the powder away into a trash bin 28. However, in some embodiments the pneumatic assembly 24, 26 is connected to a return powder device 28, which is further connected to the feed assembly 18, for recycling unused powder back to the feeding assembly 18. However, for systems where recycling is not possible or optimal, a solution with a trash bin 28 may be used instead.

For embodiments incorporating a return powder device 28, in order to maintain a high quality of the objects that are produced by the system, reused powder should be mixed with virgin powder. The powder mixture comprises virgin powder and reused powder in certain proportions depending on the materials used, in one embodiment there should be at least 30% virgin powder. In order to achieve this mixing of used powder and virgin powder, the supply unit 30 and the return powder device 28 are interconnected with a powder mixing device 32 by tubes 34, and the powder mixing device 32 is in turn connected with the feeding assembly 18, also by use of tubes 34. A typical process of removing powder would be as follows: powder is transported away from the build chamber 14 through the at least one opening 22 by means of the pneumatic assembly 24, 26 to the return powder device 28. Then, powder is transported from the return powder device 28 to the powder mixing device 32, and virgin powder is transported from the powder supply unit 30 to the powder mixing device 32 through tubes 34. The virgin powder and the used powder is mixed together at the powder mixing device 32, and then transported to the feeding assembly 18 through tubes 34. The powder supply unit 30 and the return powder device 28 are generally spaced apart and interconnected by tubes 34 and the powder mixing device 32, but the powder supply unit 30 may also be directly connected to the return powder device 28.

In some embodiments, there may be an air/powder separator 38 connected to the powder mixing device 32, disposed above the feeding assembly 18, for separating powder from air and providing powder into the feeding assembly 18. In some embodiments, the air/powder separator may be connected to the powder supply device 30 or to the powder return device 28 rather than the powder mixing device 32. Furthermore, the powder return device 28 may in some embodiments incorporate an air/powder separator for separating powder from air before transporting it further. Using an air/powder separator 38 is especially applicable when using air for transporting powder in the system.

The system presented in FIG. 1 shows one embodiment of the sintering system of the present disclosure. One of the problems solved by the current system is how to make a sintering system adapted for personal use. Safety is one thing that becomes increasingly important as the knowledge of the system had by an intended user decreases. By having a movable floor 16 and at least one opening 22 in the build chamber 14 as described above, powder may be transported away from the build chamber 14 after a manufacturing process has been completed, in a safe and effective manner.

Further adaptations to increase security may be made to the system without departing from the spirit and the scope of the invention, some of which will be described below, while others are apparent to a person having skill in the art.

For example, the present system may incorporate a mechanism for making it impossible to open the build chamber during a manufacturing process, in order to not have a user inadvertently open it and release powder from the system into the air. Such an adaptation may be through a locking mechanism for the build chamber 14, for instance located at the removable roof portion. The locking mechanism may be controlled by a computer which is connected to the sintering system, or it may be manually controlled by a user of the sintering system. In some embodiments, the whole build area 200 as shown in FIG. 3, may be the part that is closed off during a manufacturing process rather than only the build chamber 14.

A further adaptation may also be made that the energy source 12 is not possible to turn on when any part of the build chamber 14 or build area 200 is open in the sense that powder may spread from there to outside of the sintering system.

Another adaptation to increase safety is to enclose the energy source 12, or the whole energy assembly 10, 12, in order to decrease the risk of the energy beam hitting sensitive areas of a user, particularly the eyes.

The build chamber will now be described with reference to FIG. 2, which shows an enlarged version of the build chamber 14 as compared to FIG. 1. The build chamber comprises a movable floor 16 as described previously. This movable floor 16 may be movable through having height adjusting means 52 disposed on a bottom side of the movable floor 16 through an opening 50 in the bottom of the build chamber 14, and the height adjusting means 52 may be extendable in order to move the movable floor 16 between a first position and a second position. In the first position, the movable floor 16 is above the at least one opening 22, and in the second position the movable floor 16 is below the opening 22. In such an embodiment, the movable floor 16 would typically be moved to the second position only after a manufacturing process has been completed, and when the movable floor 16 is in the second position unused powder may be transported away from the build chamber 14. In one embodiment, the movable floor 16 is adapted to be hermetically sealed in terms of powder escaping away from the build chamber. Furthermore, the opening 22 may be adapted to be closed when the movable floor 16 is above the opening 22, as an extra safety mechanism.

The pneumatic assembly 24 as shown in FIG. 2 may comprise only a suction unit adapted to apply suction in order to transport powder away from the build chamber. However, the pneumatic assembly 24 may further comprise a fan, for instance positioned opposite to the opening 22, for pushing powder by use of air, for further improving the transportation of powder. In some embodiments, there may be a fan disposed on one side of the build chamber adapted to transport powder away through an opening 24, without a suction unit. Additional embodiments may comprise a fan in a top portion of the build chamber 14 directed downward, to further help direct the powder towards the opening 22.

The sintering system may also be adapted in ways to increase the efficiency and the effectiveness of the system, which may be applicable for both industrial and personal use.

One such adaptation is to pre-heat the build chamber 14 before the sintering process starts. Pre-heating the build chamber 14 may make the conditions more favorable for the powder, and thus increase the quality of the manufactured product. One way of achieving such pre-heating is to have heating units, for instance halogen lamps or small radiators, installed in the build chamber 14, which may for instance be disposed at the walls, the roof portion and/or at the movable floor 22. Another implementation is to have fans providing heated air into the chamber 14. The concept of pre-heating the build chamber 14 is also applicable for other parts of the sintering system, especially the tubes 34 for transporting the powder, the return powder device 28 and the feeding assembly 18. Another way of implementing the same concept is to use heated air when transporting powder, instead of pre-heating the pathways.

Another adaptation is to incorporate filters in the system, for further improving the transportation of powder by breaking up portions of powder that have been lumped together. Such filters may for instance be incorporated in the return powder device 28 and/or in the tubes 34.

FIG. 3 illustrates one embodiment in which the entire build area 200 is in a part of the system that may be closed off during manufacturing. In one embodiment, the parts outside of the build area 200 are possible to interact with during the sintering process, while parts inside the build area 200 are closed off for safety purposes. However, in other embodiments the entire sintering system is comprised within an enclosure 300/closed system, in order to make it impossible for a user to inadvertently interact with the system in a way that could result in damage or injury. The system may be further adapted to automatically turn off when sensing physical interaction by a user, such as touching the system, to increase safety.

The architecture of the current system will now be explained with reference to FIG. 4. The present sintering system 100 generally comprises a controller/microprocessor 110 operably connected to the sintering system 100 for operating and controlling the system, and the system 100 is typically connected to at least one server 120, comprising a database, from which the sintering system 100 may be controlled by a user. The user may be connected to the server through a client equipment 130. In a typical embodiment the sintering system 100 is adapted to be able to communicate with at least one server 120. In some embodiments, it is possible to communicate with the server or servers 120 through a computer cloud.

A user of the sintering system may input commands at the server 120, or at a client equipment 130 connected to the server, for controlling the sintering system 100. Any object that is to be manufactured is generally provided as design data from the server 120 to the sintering system 100. Such design data is generally prepared in a computer software adapted for three-dimensional manufacturing of objects. When the server 120 provides design data to the sintering system 100, the system may start the manufacturing process. A typical process for manufacturing a three-dimensional object according to the present disclosure will now be described with references to FIGS. 1-4.

A user may upload a file to the server 130, comprising design data for a three-dimensional object. This interaction with the server 130 may for instance be through a website, a client equipment 130 or a computer cloud. After the file has been uploaded to the server 130, the server 130 may determine movement patterns and speed for the energy source 12 in the sintering system. In some embodiments, this determination of movement patters may also be performed at the sintering system 100, for instance by a controller 110 operably connected to the system. It may also describe an order of sequences in which the sintering process should be performed. After the movement pattern(s) for the energy source have been calculated, the design data may be sent to the sintering system 100.

After the sintering system 100 has received the instructions from the server 120, the sintering process may be initiated. Typically, the system is adapted with safety features as described previously, and will start by ensuring that predetermined criteria are fulfilled, such as the roof portion of the build chamber 14 being closed and the movable floor 16 being above the opening 22, or that the entire build area 200 is closed off. Then, the movable floor 22 is lowered a predetermined distance, which distance is the thickness of the layer to be sintered. Powder is fed into the build chamber 14 from the feeding assembly 18, by the powder distribution device 20, whereafter the energy source 12 may be turned on and the sintering process may be started. In a typical embodiment, the feeding assembly 18 also comprises a movable floor, which starts at a bottom position when the feeding assembly 18 is filled with powder, and is then moved upwards for each layer of powder that is to be distributed into the build chamber 14.

This process is then repeated for each layer of the three-dimensional object to be produced. After all layers have been sintered, the object is finished and the process of removing unused powder may begin. This process is performed by lowering the movable floor 16 below the opening 22, thus allowing any unused powder to be transported away from the build chamber 14 through the opening 22. This transportation is generally done by use of a pneumatic assembly 24, 26, as described previously. In order to ensure that all powder is removed from the build chamber, a sensor for detecting powder may be used, for instance disposed inside the build chamber 14, or a pre-set time interval may be used for the process of removing powder from the build chamber 14.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". Moreover, it is not necessary for an apparatus or method to address each and every problem sought to be solved by the presently described concept, for it to be encompassed hereby.

The invention claimed is:

1. A sintering system for manufacturing a three-dimensional object from sinterable powder, said system comprising:
   a build chamber comprising a movable floor and four side walls;
   an energy assembly disposed above said build chamber, said energy assembly comprising at least one energy source adapted to emit an energy beam;
   a feeding assembly connected to said build chamber, said feeding assembly configured to provide sinterable powder to said build chamber;
   a powder distribution device connected to said feeding assembly, said powder distribution device configured to distribute sinterable powder in said build chamber;
   wherein said build chamber further comprises:
   opposite openings in two said side walls of said build chamber, below which openings said movable floor can be lowered; and
   a closable cover arranged above said opposite openings, said closable cover, when closed, configured to seal a build chamber portion between said cover and said movable floor; and
   a pneumatic assembly connected to said build chamber portion configured to transport powder away from said build chamber portion through at least one of said openings, said pneumatic assembly comprising a first combined suction/blower unit at a first side opening and a second combined suction/blower unit at a second opposite side opening, each said first combined suction/blower unit and said second combined suction/blower unit configured to alternately provide said build chamber portion with blowing from said first side opening and with suction from said second opposite side opening, and conversely with suction from said first side opening and with blowing from said second opposite side opening; and
   an enclosure, delimiting said sintering system such that it can be closed off in its entirety during a manufacturing process.

2. The system according to claim 1, wherein said system further comprises a powder catcher connected to said build chamber for collecting surplus powder provided by said powder distribution device to said build chamber.

3. The system according to claim 1, further comprising an air/powder separator disposed above said feeding assembly.

4. The system according to claim 1, further comprising:
   a return powder device connected to said pneumatic assembly comprising at least one fan, for transporting unused powder away from said build chamber.

5. The system according to claim 4, further comprising:
   a powder supply device for providing virgin powder;
   a powder mixing device connected to said return powder device and to said powder supply device for mixing returned powder with virgin powder and supplying a resulting powder mix to said feeding assembly;
   wherein said return powder device further is adapted to perform powder transport from said build chamber portion into said powder mixing device.

6. The system according to claim 1, wherein one or more of said feeding assembly, said movable floor, said return powder device and said powder mixing device are further adapted to heat any present powder.

7. The system according to claim 1, wherein said sintering system further comprises:
   a server operably connected to said sintering system comprising a database;
   wherein design data is provided by the server to said sintering system, and
   wherein said server is adapted to determine and provide a movement pattern for said energy assembly to said sintering system.

* * * * *